Patented Nov. 10, 1931

1,831,707

UNITED STATES PATENT OFFICE

HENRY A. GARDNER, OF WASHINGTON, DISTRICT OF COLUMBIA

CEMENT FOR FLOOR COVERING COMPOSITIONS

No Drawing. Application filed May 14, 1930. Serial No. 452,521.

The present invention relates to compositions adapted for use in the production of floor coverings of the type known generally by the designation "linoleum", and is more particularly concerned with those compositions of the linoleum type in which resinous materials are used as binders.

By the term "linoleum" is here meant a floor covering consisting essentially of a composition comprising oxidized and/or polymerized oils, e. g., oxidized linseed oil, with ground cork or wood flour, which compositions are adapted to be pressed, molded or otherwise formed upon a fabric or equivalent backing to the production of a limitedly flexible floor covering.

In the production of the above-defined compositions resins or resinous bodies heretofore have in many instances been added as cement binders. Thus, for instance, oxidized or polymerized oils, such as linseed, tung, or other oils, have been ground to a meal and heated with rosin and/or kauri gum to produce a cement. After the cement had aged, it has been shredded and to it have been made additions of ground cork or wood flour, with or without added pigments or other coloring materials. The mixed materials, after suitable preparation, have been calendered upon burlap, or cut up into patterns and pressed upon a fabric, or molded in forms to produce plain, inlaid, straight line, or other types of linoleum. One of the most important constituents in such compositions are the resinous bodies which are compounded with the oxidized oil and the ground cork or wood meal so that the particles will adhere together satisfactorily.

The resins heretofore used in the manufacture of the linoleum cement referred to above are rosin, kauri gum, and similar natural resins, which resins are, in general, readily attacked or saponified by alkalies. Since linoleum, when laid upon floors, is often scrubbed with highly alkaline soaps and soap powders, disintegration of the linoleum, largely due to the effect of the alkali upon the contained saponifiable resins, may and frequently does occur. Moreover, when linoleum is laid upon damp cement floors, the action of the alkalies removed from the cement by water has a very quick disintegrating effect upon the linoleum which buckles and disintegrates under such conditions.

An object of the present invention is to provide a composition which is resistant to saponification or attack by alkalies. Another object of invention is the provision of such a composition having improved adhesion between the solid components thereof.

I have found that the effect of alkalies may be almost entirely eliminated, and the above and other objects of invention attained, through the use as binder of a new resinous substance, namely chlorinated diphenyl, substituted entirely or partially for the rosin, kauri gum, or other resins heretofore used. Chlorinated diphenyl, i. e., the product obtained by chlorinating diphenyl, is a resinous body which may range from a hard, solid mass to a soft, sticky, adhesive mass (e. g., see Annalen der Chemie, vol. 189, pages 138 and 145; and vol. 207, pages 339 and 342). The commercial product chlorinated to about 60%, i. e., containing 60% of chlorine, is illustrative. The adhesive properties of the resin are tremendous. This resin, however, may be boiled with a concentrated aqueous solution of caustic soda, without detriment, being insoluble in caustic soda solutions of practically any strength.

Protection of a composition of the linoleum type against attack by alkalies may be effected not only by incorporating chlorinated diphenyl into the composition as the resinous cement binder but also by applying to a final linoleum product a surface coating of a varnish or lacquer consisting essentially of, or containing, chlorinated diphenyl. Chlorinated diphenyl varnish or lacquer adheres excellently to the surface of linoleum and to equivalent surfaces, forming thereon an alkali-resistant coating, and hence serves to protect a linoleum such, for instance, as a printed linoleum, which otherwise would be subject to deterioration by alkali.

The following example is merely illustrative of an operable embodiment of the invention in its application to the production of a linoleum cement:

Oxidized linseed oil, 100 parts, is heated, with stirring, in a suitable vessel with chlorinated diphenyl, 30 to 60 parts, at a temperature slightly above the melting point of the mixture, until the latter attains the desided "body". The resulting mass, which is a linoleum cement, is then allowed to cool and age, and thereafter is broken up by shredding. Into 100 parts of the shredded product, 20 to 50 parts of ground cork are incorporated by thoroughly mixing and/or grinding, and the resulting composition is calendered upon a burlap base.

As will be obvious to those skilled in this art, I may, without departing from the invention, make reasonable variations, substitutions and additions in and to the above example. Thus: I may add a modifying agent such as castor oil, bituminous material, milled rubber, or cellulose esters or ethers, to the cement; or, I may vary within reasonable limits the proportions of the resinous bodies to the other ingredients and may use chlorinated diphenyl in combination with other synthetic or natural resins, as the resinous binder component; or, I may substitute wood flour or other equivalent for part or even all of the cork; or, I may add a pigment or color.

I claim:

1. A composition adapted for use in the preparation of linoleum and consisting essentially of oxidized or polymerized oils and a resinous binding material, characterized in that the resinous binding material comprises chlorinated diphenyl.

2. A composition adapted for use in the preparation of linoleum and consisting essentially of thickened oil, cork, pigment and filler bound together with a resinous binding material comprising chlorinated diphenyl.

3. Linoleum containing chlorinated diphenyl.

In testimony whereof, I affix my signature.

HENRY A. GARDNER.